United States Patent [19]

Kirschbaum

[11] Patent Number: 4,476,422

[45] Date of Patent: Oct. 9, 1984

[54] SINGLE PHASE FOUR POLE/SIX POLE MOTOR

[75] Inventor: Herbert S. Kirschbaum, Asheville, N.C.

[73] Assignee: Westinghouse Electric Corp., Pittsburgh, Pa.

[21] Appl. No.: 484,020

[22] Filed: Apr. 11, 1983

[51] Int. Cl.³ .............................................. H02P 7/48
[52] U.S. Cl. ..................................... 318/776; 310/198
[58] Field of Search ............... 318/772, 773, 774, 775, 318/776; 310/198

[56] References Cited

U.S. PATENT DOCUMENTS

| | | | |
|---|---|---|---|
| 2,464,253 | 3/1949 | Morrill | 318/772 |
| 3,233,160 | 2/1966 | Rawcliffe | 318/776 |
| 3,619,730 | 11/1971 | Broadway | 318/776 |
| 3,619,748 | 11/1971 | Eastham | 318/774 X |
| 4,066,937 | 1/1978 | Pfarrer et al. | 318/775 |

*Primary Examiner*—J. V. Truhe
*Assistant Examiner*—Bentsu Ro
*Attorney, Agent, or Firm*—R. P. Lenart

[57] ABSTRACT

A single phase alternating current electric motor is provided with a main stator winding having two coil groups each including the series connection of three coils. These coil groups can be connected in series for six pole operation and in parallel for four pole operation. The coils are approximately equally spaced around the periphery of the machine but are not of equal numbers of turns. The two coil groups are identically wound and spaced 180 mechanical degrees apart. One coil of each group has more turns and a greater span than the other two coils.

26 Claims, 10 Drawing Figures

SINGLE PHASE FOUR POLE/SIX POLE MOTOR

STATEMENT OF GOVERNMENT INTEREST

The United States Government has rights in this invention under Prime Contract No. W-7405-ENG-26 and Subcontract No. 86X-24712-C awarded by the Department of Energy.

BACKGROUND OF THE INVENTION

This invention relates to pole changing, single phase alternating current rotary electric machines, and more particularly to induction motors having stator windings which are capable of alternatively being connected for four pole and six pole operation.

High efficiency heat pumps require high efficiency fan and blower motors having multispeed capabilities. Conventional multispeed motors employ an extra winding that effectively reduces the operating flux level which is equivalent to voltage reduction in a polyphase motor. The resulting speed-torque curve of the motor is reduced and the motor operates at reduced speed determined by the intersection of the blower or fan speed-torque characteristic with the motor speed-torque characteristic. In order to get significant speed reduction, the motor then operates at a high value of slip which leads to very poor efficiency. Since the blower motor of a high capacity heat pump may operate at low speed for about 75% of the pump's operating hours, the use of a two speed blower motor based on a high slippage at the low speed is undesirable.

Pole changing alternating current electric motors have been developed to provide for multispeed operation without high slippage values. For example, U.S. Pat. No. 3,233,160 issued Feb. 1, 1966 to Rawcliffe discloses a single phase alternating current pole changing motor having a stator winding arrangement which includes two windings for connection together to a single phase alternating current supply to provide a running field for the motor wherein each winding is wound for a first pole number and has winding parts arranged for alternative connection in the circuit according to a method of pole amplitude modulation, thereby providing second and third pole numbers together in each winding considered independently. An additional stator winding is provided for connection to the single phase alternating current supply through a phase shifting means, to provide a starting field for the motor. The first two windings are physically disposed for elimination of the third pole number from the running field.

U.S. Pat. No. 3,619,730 issued Nov. 9, 1971 to Broadway et al., discloses a four pole/six pole machine which utilizes a pole amplitude modulation technique. The Broadway et al. patent employs four stator field coils in the main winding and favors a four pole field. In addition, Broadway et al. shows only a four pole (consequent pole) auxiliary winding, which would be used only in the four pole connection and would be disconnected when running as a six pole machine. Therefore, the machine could be started only in the four pole mode. The present invention utilizes six field coils in the main winding of a four pole/six pole single phase motor, and can be started when connected for either pole number.

SUMMARY OF THE INVENTION

A single phase alternating current electric motor constructed in accordance with this invention comprises: a main stator winding including two identical coil groups spaced 180 mechanical degrees apart and each having three series connected coils, wherein all six coils are approximately equally spaced around the motor periphery and at least two of the coils have an equal number of turns which differs from the number of turns of the other coil; means for connecting the two main stator winding coil groups for six pole motor operation; and means for connecting the two main stator winding coil groups for four pole motor operation, wherein one of the coil groups has a reverse polarity with respect to its connection for six pole operation. For example, the coil groups may form six poles when connected in series and four poles when connected in parallel. Several auxiliary winding configurations can be connected in series with a phase shifting means, such as a capacitor, to the motor power source. In one embodiment, the auxiliary stator winding comprises two identical coil groups spaced 180 mechanical degrees apart and each having three series connected coils wherein all six auxiliary coils are approximately equally spaced around the motor periphery and displaced 90 electrical degrees, on a six pole basis, from the main stator winding coils, with at least two of the six auxiliary coils having an equal number of turns which differs from the number of turns in the other auxiliary coils. These auxiliary winding coil groups can be alternatively connected for six or four pole operation respectively. Alternatively, two separate auxiliary windings can be wound using the slot space not used by the main winding.

DESCRIPTION OF THE PREFERRED EMBODIMENTS

Figure 1:
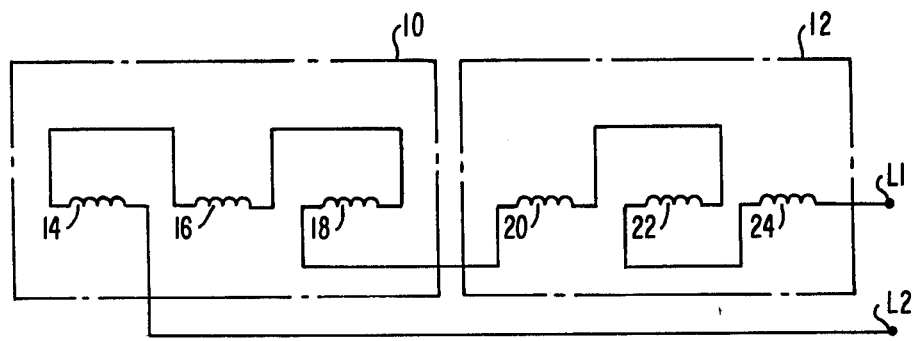
FIG. 1 is a schematic diagram of a main stator winding circuit having two ungraded coil groups connected in series in accordance with one embodiment of this invention.

A four pole/six pole electric motor constructed in accordance with the preferred embodiment of this invention uses a single main and a single auxiliary winding. The main stator winding includes six pole coils which are approximately equally spaced around the machine periphery. However, all coils do not have the same span and number of turns. Referring to the drawings, FIG. 1 is a schematic diagram of the main stator winding of a motor constructed in accordance with this invention. Two coil groups, 10 and 12 are shown to be connected in series between a pair of line power terminals, L1 and L2. Coil group 10 comprises the series connection of coils 14, 16 and 18, while coil group 12 comprises a series connection of coils 20, 22 and 24. The series connection of coil groups 10 and 12 results in six pole operation of the motor.

Figure 2:
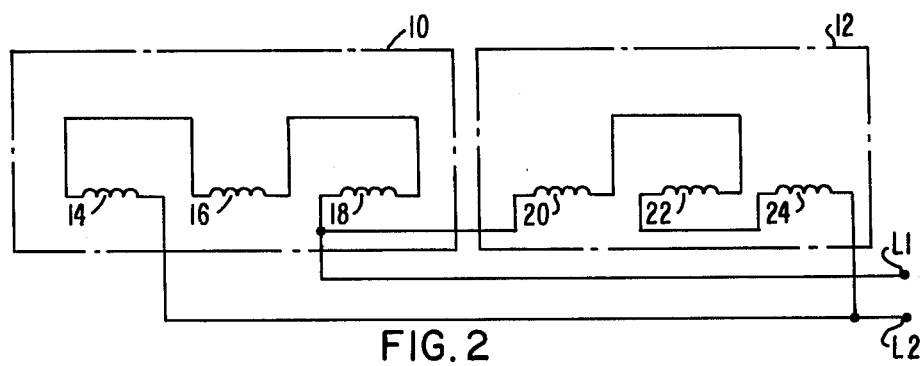
FIG. 2 is a schematic diagram of the stator winding of FIG. 1 connected in parallel in accordance with this invention.

FIG. 2 is a schematic diagram of the stator winding of FIG. 1 showing the coil groups 10 and 12 connected in parallel between line terminals L1 and L2 for four pole motor operation. In this connection, the polarity of coil group 12 is reversed with respect to the connection of FIG. 1.

Figure 3:
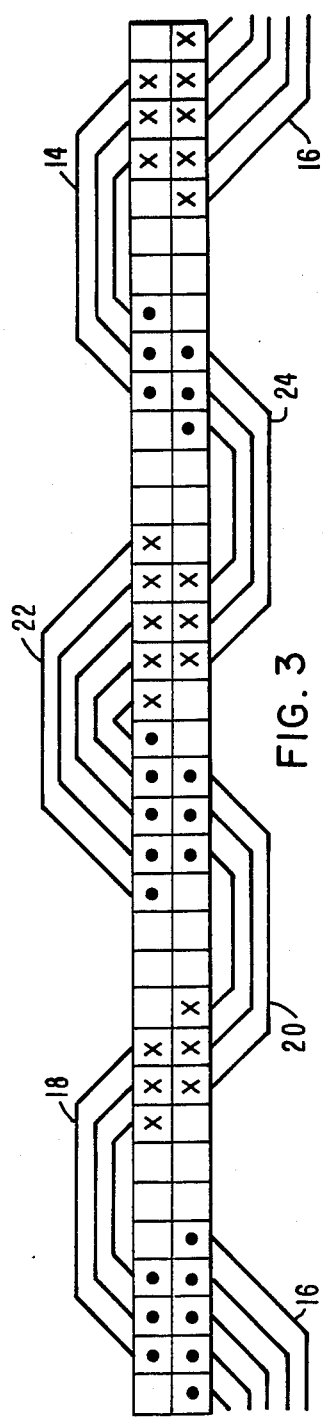
FIG. 3 is a wiring diagram of a 36 slot motor showing the main stator winding connected for six pole operation in accordance with one embodiment of this invention.

FIG. 3 is a wiring diagram showing the slot loading of a 36 slot stator having the main stator winding connected in series for six pole operation as in FIG. 1. In this Figure, the dots indicate instantaneous current flow out of the sheet, while the X's indicate instantaneous current flow into the sheet. Coils 16 and 22 are designated as primary coils, are disposed 180 mechanical degrees apart and are identically wound to include five coil elements, the largest of which has a coil throw of 11 slots. The remaining four coils are designated as secondary coils with each having three coil elements, the largest of which has a coil throw of 7 slots. These smaller coils are disposed in such a way around the periphery of the machine, that their centers are six slots from each other. This corresponds to 180 electrical degrees separation. The span of the primary coils should be as nearly equal to two pole pitches, of the six pole field, as possible within any constraints imposed by the number of slots available. In addition, the secondary coils should span one pole pitch, or be one or two slots wider than one pole pitch of the six pole field.

The preferred embodiment auxiliary winding has the same structure as the main stator winding, although it may have a different number of turns per coil and be wound with a different size wire. It is displaced 3 slots from the main winding so that the fundamental six pole flux distributions of the main and auxiliary windings are in space quadrature. However, this is not a necessary constraint, as non-quadrature winding placement in the six pole configuration would be permissible.

The auxiliary winding comprises two coil groups, each including the series connection of a primary coil and two secondary coils. These coils have the same relative angular position around the motor periphery as the coils of the main stator winding. That is, the auxiliary winding coils are spaced 90 electrical degrees apart with each primary auxiliary coil being centered between two secondary auxiliary coils of the same group. The auxiliary winding coil groups are spaced 180 mechanical degrees apart. Within each group, the primary auxiliary coil has more turns and a larger span than each of the secondary coils. As in the main winding, the primary auxiliary coils should span about two pole pitches of the six pole field, within any constraints imposed by the number of slots available. The secondary auxiliary coils should span about one pole pitch, or be one or two slots wider than one pole pitch of the six pole field. Each primary auxiliary coil should have about 1⅔ times the number of turns in each secondary auxiliary coil.

In the winding arrangement shown in FIG. 3, the number of conductors in each coil side are identical. Therefore, primary coils 16 and 22 have 1⅔ times as many turns as secondary coils 14, 18, 20 and 24, and each primary coil is centered between the two secondary coils of the same group. In other embodiments, the position of the primary winding may be interchanged with that of either secondary winding. With the FIG. 3 winding distribution, magnetomotive force 26 of FIG. 4 includes a six pole fundamental 28 with a significant two pole subharmonic 30. In other embodiments, it is not necessary for the number of conductors in each coil side to be identical since grading of the coils would be permissible.

Figure 4:
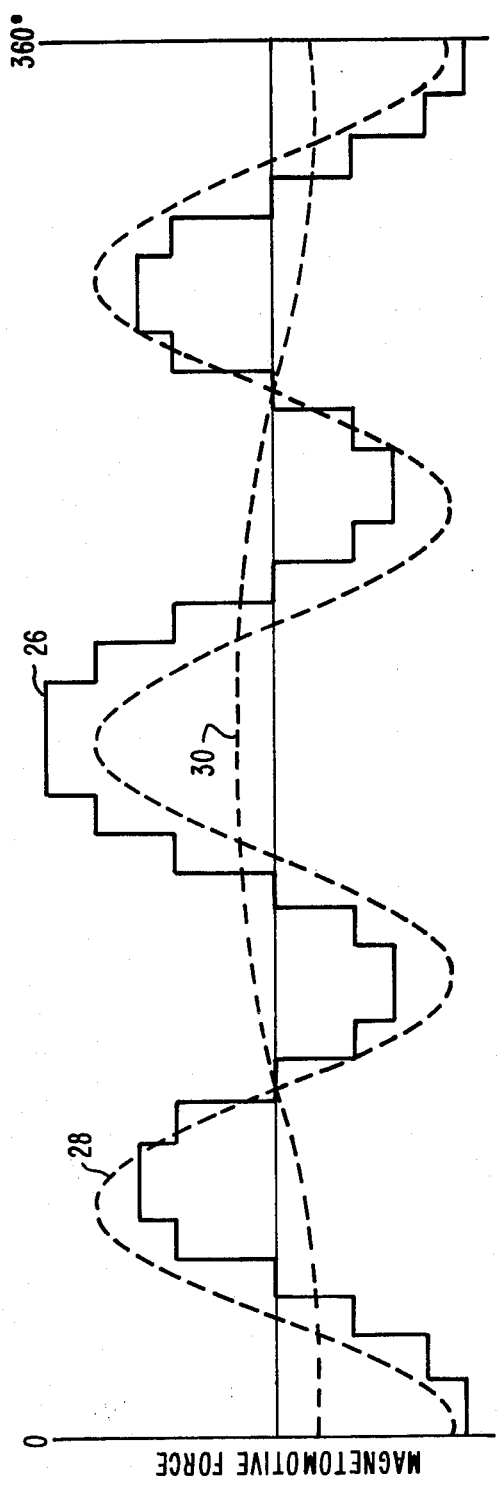
FIG. 4 is a magnetomotive force diagram produced by the winding arrangement of FIG. 3.
Figure 5:
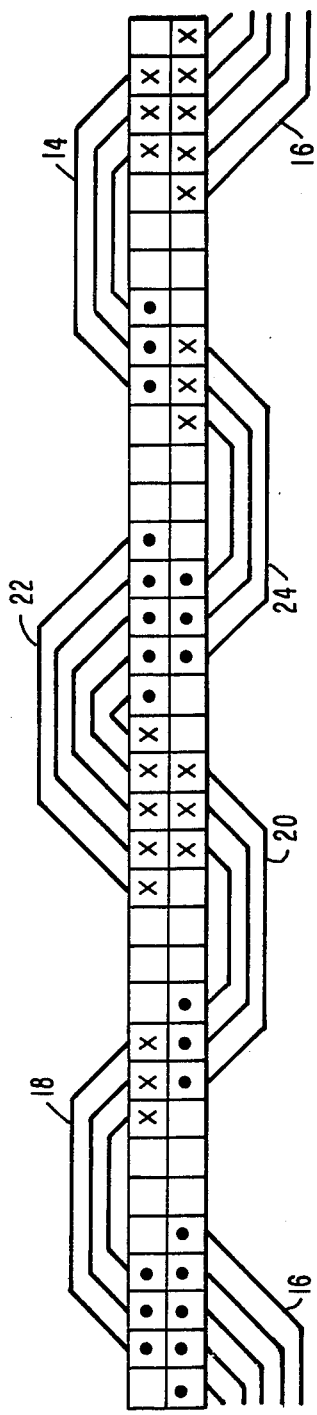
FIG. 5 is a wiring diagram of a 36 slot electric motor showing the main stator winding connected for four pole operation in accordance with this invention.
Figure 6:
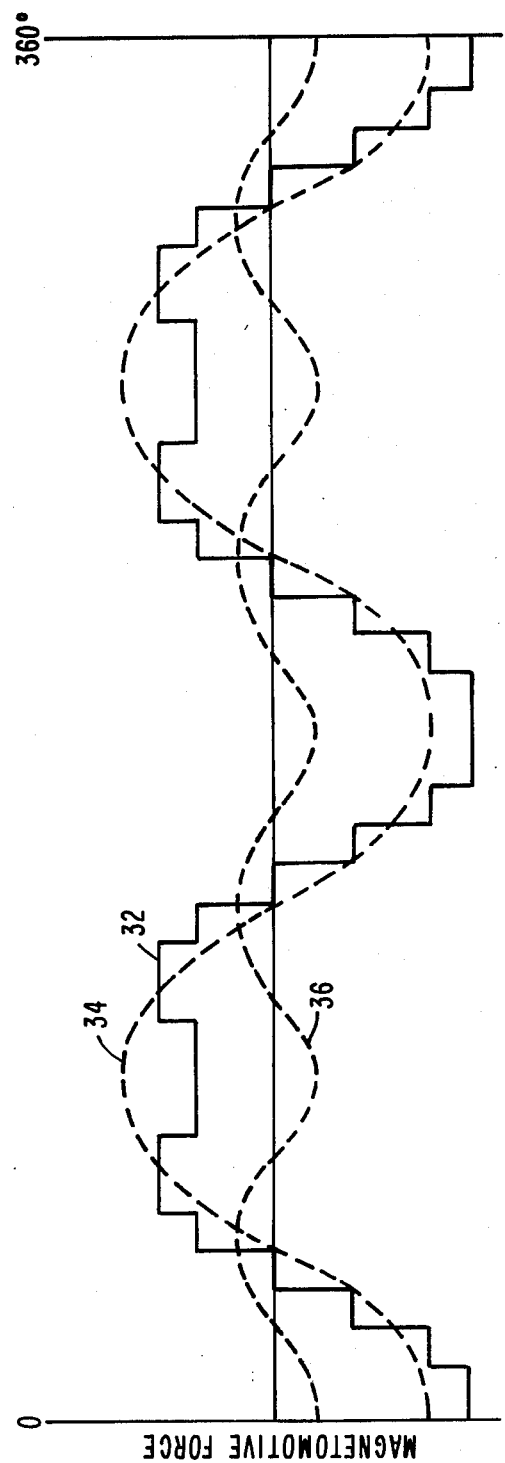
FIG. 6 is a magnetomotive force diagram produced by the winding of FIG. 5.

FIG. 5 is a wiring diagram of the main stator winding of FIG. 4 which is connected in accordance with FIG. 2 for four pole operation. It can be seen that half of the coils are reversed relative to their connection for six poles as in FIG. 4. The resulting magnetomotive force 32 of FIG. 6 shows a dominant four pole field 34 and a smaller 8 pole field 36. In this embodiment, the auxiliary winding groups would also be connected in parallel to form a four pole field. Since the auxiliary winding is displaced three slots from the main winding, the two four pole fields are not longer in space quadrature, the angle now being 60 electrical degrees. It can be shown that if the current in this auxiliary winding could be made to lead the current in the main winding by 120 electrical degrees, the four pole field would have only a forward rotating component. By appropriate selection of an auxiliary winding capacitor, this is possible at one operating load. If the two currents are in quadrature, the four pole field would contain both forward and backward rotating components.

Figure 7:
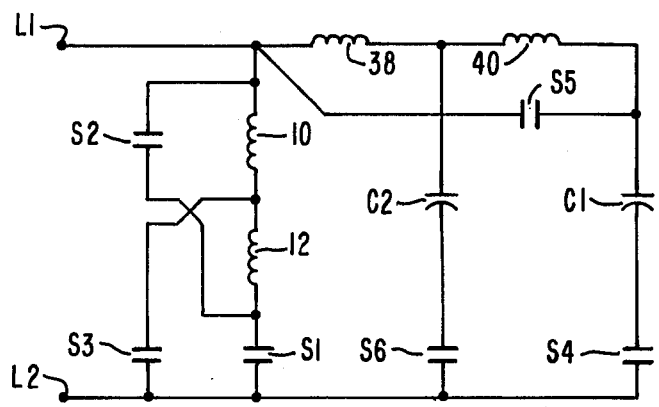
FIG. 7 is a schematic diagram of the stator circuit of a motor constructed in accordance with one embodiment of this invention.

FIG. 7 is a schematic diagram constructed in accordance with this invention which is capable of four pole or six pole operation. For six pole operation, main stator winding coil groups 10 and 12 are connected in series between line terminals L1 and L2 through the closure of switch S1. Similarly, auxiliary stator winding coil groups 38 and 40 are connected in series with capacitor C1 and between line terminals L1 and L2 through the closure of switch S4. Remaining switches S2, S3, S5 and S6 remain open for six pole operation. For four pole operation, switches S1 and S4 are opened, while switches S2, S3, S5 and S6 are closed. This connects main stator winding coil groups 10 and 12 in parallel with each other between line terminals L1 and L2, while auxiliary stator winding coil groups 38 and 34 are connected in parallel with each other and in series with capacitor C2 to form an auxiliary circuit which is connected across line terminals L1 and L2.

Figure 10:
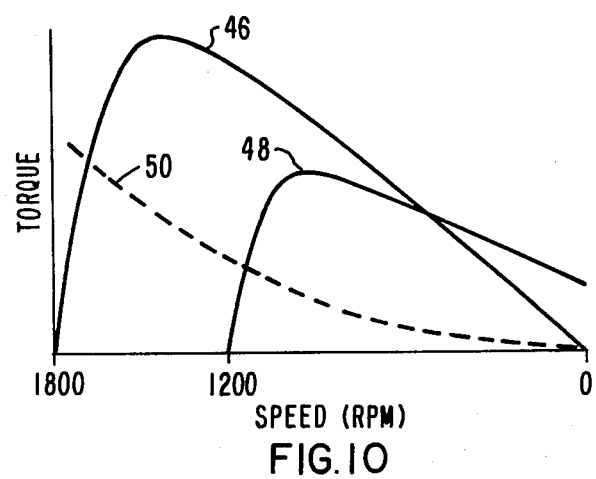
FIG. 10 is a speed-torque curve for an embodiment of this invention employing a single fixed pole number auxiliary winding.
Figure 8:
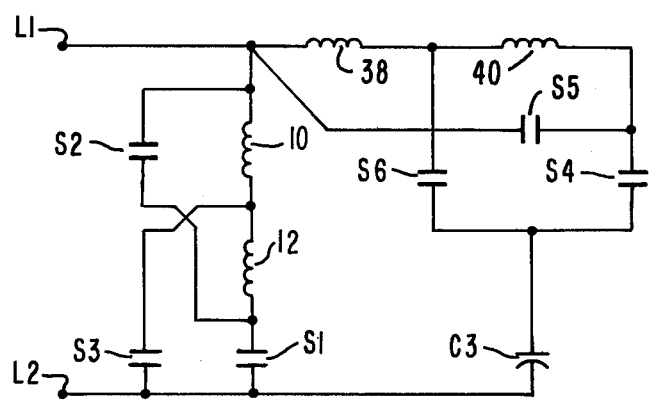
FIG. 8 is a schematic diagram of the stator circuit of an alternative embodiment of this invention.
Figure 9:
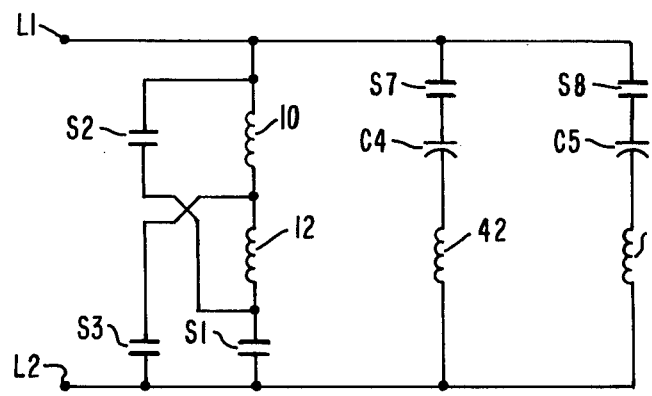
FIG. 9 is a schematic diagram of the stator circuit of another alternative embodiment of this invention.

FIG. 8 shows an alternative stator winding circuit diagram which utilizes a single capacitor C3 in series with the auxiliary winding. In this embodiment, six pole operation is again accomplished through the closure of switches S1 and S4 while the other switches remain open. Four pole operation is accomplished through the reversal of all switches. FIG. 9 shows another alternative embodiment stator circuit wherein switches S1, S2 and S3 are again used to connect main stator winding coil groups 10 and 12 in series or parallel for six pole or four pole operation respectively. However, separate non-pole changing auxiliary windings 42 and 44 have been provided. Auxiliary stator winding 42 would be wound for 6 poles and is connected in series with capacitor C4 through switch S7 for 6 pole operation, while auxiliary stator winding 44 would be wound for four poles and connected in series with capacitor C5 through S8 for four pole operation. The embodiment illustrated by FIG. 9 can also be modified to eliminate switch S8, capacitor C5 and auxiliary stator coil 44 thereby leaving a single six pole auxiliary stator coil 42. In this modified embodiment, auxiliary stator coil 42 would be connected between line terminals L1 and L2 during both four pole and six pole operation. With this modified embodiment, the speed-torque characteristics of FIG. 10 are obtained. Curve 46 represents the four pole speed-torque characteristic while curve 48 represents the six pole speed-torque characteristic. A typical fan blower load characteristic is shown as curve 50. It should be apparent to those skilled in the art that this motor can only be started as a six pole motor since the four pole speed versus torque characteristic goes to zero at 0 rpm.

The distribution factors as exemplified by the total effective series conductors have been computed for the six pole and four pole winding arrangements of FIGS. 3 and 5. In that embodiment, each coil side element has an identical number of conductors. If this number of conductors is designated as $N_c$, the six pole winding has a total of 44 $N_c$ series conductors. Because of the distributed nature of these conductors in the six pole field, the effective number of series conductors is 35.53 $N_c$, which leads to a distribution factor of 0.8075. The four pole configuration has 22 $N_c$ series conductors. The effective number of series conductors in this case is 14.70 $N_c$ for a distribution factor of 0.6683. For this winding configuration, the ratio of the magnetic flux density in the six pole field to the magnetic flux density in the four pole field is 0.6206. The torque capability of the machine varies approximately as the square of the flux density for a given slip. Thus the six pole torque capability would be 38.5% of that of the four pole machine. Blower load torque at the six pole speed would be approximately 4/9 that of the blower load torque at the four pole speed or 44.4%.

Although the present invention has been described in detail in terms of its preferred embodiments, it will be apparent to those skilled in the art that various changes or modifications may be made without departing from the invention. For example, the main stator winding coil groups 10 and 12 can be connected in either series or parallel to obtain both four and six pole operation. Table I lists the possible connection configurations.

TABLE I

| | Stator Winding Configurations | |
|---|---|---|
| Configuration | Six Pole Group Connections | Four Pole Group Connections |
| 1 | 10 and 12 in series | 10 and 12 in parallel (12 reversed) |
| 2 | 10 and 12 in series | 10 and 12 in series (12 reversed) |
| 3 | 10 and 12 in parallel | 10 and 12 in series (12 reversed) |
| 4 | 10 and 12 in parallel | 10 and 12 in parallel (12 reversed) |

It should be understood that wherever coil group 12 is shown to be connected for reversed polarity in Table I, it could be replaced by coil group 10. This would cause a reversal of rotation of the machine. In addition, the main and auxiliary windings need not be wound in a quadrature relationship since an external phase shifting device such as a capacitor could be used. It is therefore intended that the appended claims cover all such changes or modifications that fall within the scope of the invention.

What is claimed is:

1. A single phase alternating current electric motor comprising:

a main stator winding wound to pass through a plurality of uniformly spaced slots in a stator and including two identical coil groups each having three series connected coils wherein all six coils are approximately equally spaced around the motor periphery, corresponding coils in each of said coil groups are spaced 180 mechanical degrees apart, and a first coil in each of said coil groups has a number of turns which differs from the number of turns of the other coils;

means for connecting said two coil groups to form six poles for six pole motor operation; and means for connecting said two coil groups to form four poles for four pole motor operation, wherein one of said coil groups has a reversed polarity with respect to its connection for six pole operation.

2. An electric motor as recited in claim 1, wherein each coil group of said main stator winding comprises:

a primary coil; and two secondary coils, wherein said primary coil has more turns and a larger span than said secondary coils.

3. An electric motor as recited in claim 2, wherein the span of each of said primary coils is about two pole pitches and the span of each of said secondary coils is about one pole pitch.

4. An electric motor as recited in claim 2, wherein said primary coils are centered between said secondary coils of the same coil group.

5. An electric motor as recited in claim 2, wherein the number of turns in each of said primary coils is approximately 1⅔ times the number of turns in each of said secondary coils.

6. An electric motor as recited in claim 1, further comprising:

an auxiliary stator winding wound to pass through said uniformly spaced slots in said stator and including two identical coil groups each having three series connected coils wherein all six auxiliary coils are equally spaced around the motor periphery with corresponding coils in each of said auxiliary winding coil groups being spaced 180 mechanical degrees apart and with at least two of said six auxiliary coils having an equal number of turns which differs from the number of turns in the other auxiliary coils;

a capacitor;

means for connecting said two auxiliary coil groups to form six poles and in series with said capacitor for six pole motor operation.

7. An electric motor as recited in claim 6, wherein each coil group of said auxiliary stator winding comprises:

a primary auxiliary coil; and two secondary auxiliary coils, wherein said primary auxiliary coil has more turns and a larger span than said secondary auxiliary coils.

8. An electric motor as recited in claim 7, wherein the span of each of said primary auxiliary coils is about two pole pitches and the span of each of said secondary auxiliary coils is about one pole pitch.

9. An electric motor as recited in claim 7, wherein said primary auxiliary coils are centered between said secondary auxiliary coils of the same coil group.

10. An electric motor as recited in claim 7, wherein the number of turns at each of said primary auxiliary coils is approximately 1⅝ times the number of turns in each of said secondary auxiliary coils.

11. An electric motor as recited in claim 6, further comprising:
means for connecting said two auxiliary coil groups to form four poles and in series with said capacitor for four pole operation, wherein one of said auxiliary coil groups has a reversed polarity with respect to its connection for six pole operation.

12. An electric motor as recited in claim 6, further comprising:
a second capacitor; and
means for connecting said two auxiliary coil groups to form four poles in series with said second capacitor for four pole operation, wherein one of said auxiliary coil groups has a reversed polarity with respect to its connection for six pole operation.

13. An electric motor as recited in claim 1, further comprising:
a first capacitor;
a four pole auxiliary winding displaced 90 electrical degrees from said main stator winding, when connected to form four poles, and connected in series with said first capacitor to form a first auxiliary circuit;
a second capacitor;
a six pole auxiliary winding displaced 90 electrical degrees from said main stator winding, when connected to form six poles, and connected in series with said second capacitor to form a second auxiliary circuit; and
means for alternatively connecting one of said first and second auxiliary circuits in parallel with said main stator winding.

14. A single phase alternating current electric motor comprising:
a main stator winding wound to pass through a plurality of uniformly spaced slots in a stator and including two identical coil groups each having three series connected coils wherein all six coils are approximately equally spaced around the motor periphery, corresponding coils in each of said coil groups are spaced 180 mechanical degrees apart, and a first coil in each of said coil groups has a number of turns which differs from the number of turns of the other coils;
means for connecting said two coil groups in series for six pole motor operation; and
means for connecting said two coil groups in parallel for four pole motor operation, wherein one of said coil groups has a reversed polarity with respect to its connection for six pole operation.

15. An electric motor as recited in claim 14, wherein each coil group of said main stator winding comprises:
a primary coil; and
two secondary coils, wherein said primary coil has more turns and a larger span than said secondary coils.

16. An electric motor as recited in claim 15, wherein the span of each of said primary coils is about two pole pitches and the span of each of said secondary coils is about one pole pitch.

17. An electric motor as recited in claim 15, wherein said primary coils are centered between said secondary coils of the same coil group.

18. An electric motor as recited in claim 15, wherein the number of turns in each of said primary coils is approximately 1⅝ times the number of turns in each of said secondary coils.

19. An electric motor as recited in claim 14, further comprising:
an auxiliary stator winding wound to pass through said uniformly spaced slots in said stator and including two identical coil groups each having three series connected coils with corresponding coils in each of said auxiliary winding coil groups being spaced 180 mechanical degrees apart and wherein all six auxiliary coils are equally spaced around the motor periphery and displaced 90 electrical degrees from said main stator winding coils, at least two of said six auxiliary coils having an equal number of turns which differs from the number of turns in the other auxiliary coils;
a capacitor;
means for connecting said two auxiliary coil groups in series with each other and in series with said capacitor for six pole motor operation.

20. An electric motor as recited in claim 19, wherein each coil group of said auxiliary stator winding comprises:
a primary auxiliary coil; and
two secondary auxiliary coils, wherein said primary auxiliary coil has more turns and a larger span than said secondary auxiliary coils.

21. An electric motor as recited in claim 20, wherein the span of each of said primary auxiliary coils is about two pole pitches and the span of each of said secondary auxiliary coils is about one pole pitch.

22. An electric motor as recited in claim 20, wherein said primary auxiliary coils are centered between said secondary auxiliary coils of the same coil group.

23. An electric motor as recited in claim 20, wherein the number of turns in each of said primary auxiliary coils is approximately 1⅝ times the number of turns in each of said secondary auxiliary coils.

24. An electric motor as recited in claim 19, further comprising:
means for connecting said two auxiliary coil groups in parallel with each other and in series with said capacitor for four pole operation, wherein one of said auxiliary coil groups has a reversed polarity with respect to its connection for six pole operation.

25. An electric motor as recited in claim 19, further comprising:
a second capacitor; and
means for connecting said two auxiliary coil groups in parallel with each other and in series with said second capacitor for four pole operation, wherein one of said auxiliary coil groups has a reversed polarity with respect to its connection for six pole operation.

26. An electric motor as recited in claim 14, further comprising:
- a first capacitor;
- a four pole auxiliary winding displaced 90 electrical degrees from said main stator winding in the four pole configuration and connected in series with said first capacitor to form a first auxiliary circuit;
- a second capacitor;
- a six pole auxiliary winding displaced 90 electrical degrees from said main stator winding in the six pole configuration and connected in series with said second capacitor to form a second auxiliary circuit; and
- means for alternatively connecting one of said first and second auxiliary circuits in parallel with said main stator winding.

* * * * *